(12) United States Patent
Freeman et al.

(10) Patent No.: US 11,790,308 B2
(45) Date of Patent: Oct. 17, 2023

(54) OBJECT TRACKING IN A MULTI-MODAL TRANSPORTATION ENVIRONMENT

(71) Applicant: THE BOEING COMPANY, Chicago, IL (US)

(72) Inventors: Roland N. Freeman, Goose Creek, SC (US); Robert J. Rencher, Normandy Park, WA (US); Nicholas W. Jones, North Vancouver (CA); Marco Calderon, Highland Village, TX (US)

(73) Assignee: The Boeing Company, Chicago, IL (US)

(*) Notice: Subject to any disclaimer, the term of this patent is extended or adjusted under 35 U.S.C. 154(b) by 43 days.

(21) Appl. No.: 16/752,211

(22) Filed: Jan. 24, 2020

(65) Prior Publication Data

US 2021/0233019 A1 Jul. 29, 2021

(51) Int. Cl.
*G06Q 10/0832* (2023.01)
*G06Q 10/0833* (2023.01)

(52) U.S. Cl.
CPC ..... *G06Q 10/0832* (2013.01); *G06Q 10/0833* (2013.01)

(58) Field of Classification Search
CPC .............. G06Q 10/0832; G06Q 10/0833
USPC ........................................................ 705/332
See application file for complete search history.

(56) References Cited

U.S. PATENT DOCUMENTS

| | | | | |
|---|---|---|---|---|
| 2018/0096175 | A1* | 4/2018 | Schmeling | G06Q 10/08 |
| 2018/0205682 | A1* | 7/2018 | O'Brien, V | G06Q 10/0833 |
| 2018/0232693 | A1* | 8/2018 | Gillen | G06Q 10/0833 |
| 2019/0242716 | A1* | 8/2019 | N | G06Q 10/08355 |
| 2019/0347606 | A1* | 11/2019 | Malecha | G06Q 10/087 |
| 2020/0090120 | A1* | 3/2020 | Nakashima | G01C 21/3423 |

FOREIGN PATENT DOCUMENTS

WO WO-2018064645 A1 * 4/2018 ............. B33Y 50/02

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), Aug. 2017, pp. 15-24. https://ieeexplore.ieee.org/document/8476874. (Year: 2017).*

* cited by examiner

*Primary Examiner* — Jeff Zimmerman
*Assistant Examiner* — Hunter A Molnar
(74) *Attorney, Agent, or Firm* — Quinn IP Law

(57) ABSTRACT

A method for observing and directing the movement of a physical object from a location to a destination, the method comprising. The method includes receiving specifications governing the physical dimensions, a material composition, a movement parameter, and an environmental control condition requirement for a physical object and storing those specifications in a shared, distributed ledger accessible by the relevant actors in a supply chain. By requiring significant events to be recorded in the distributed ledger, such a confirmations of product conformance to the specifications, documentation regarding the transport and receipt of the object, and relevant environmental conditions, the movement of the object through the supply chain can be ascertained and controlled with a high degree of visibility and accountability.

24 Claims, 6 Drawing Sheets

OBJECT TRACKING IN A MULTI-MODAL TRANSPORTATION ENVIRONMENT

TECHNOLOGICAL FIELD

The present disclosure relates generally to the transportation of products and materials and, in particular, to maintaining conformity with product or material-specific specifications in a multi-modal or otherwise complex transportation environment.

BACKGROUND

While modern supply chains have reduced the need for many individuals and entities to prospectively acquire and stockpile large quantities of products and materials, the reliance on such supply chains (which often require multiple actors such as manufacturers, warehouse operators, transportation agents, and others to work in tandem) has raised a number of technical challenges with respect to determining the capabilities of the various actors and facilities in the supply chain and determining the status of products and materials as they move through the supply chain. These technical challenges are often compounded in situations where the products and materials moving through the supply chain are susceptible to various environmental conditions, needed on a particularized time schedule, sensitive to certain handling practices, or subject to other specifications. Conventional approaches to addressing some of these issues often add significant delay, risk, and expense without significantly improving the ability to confirm and document the status of products and materials throughout their movement through the supply chain.

Therefore it would be desirable to have a system and method that takes into account at least some of the issues discussed above, as well as other possible issues.

BRIEF SUMMARY

Example implementations of the present disclosure are directed to the transportation of products and materials and, in particular, to maintaining conformity with product or material-specific specifications in a multi-modal or otherwise complex supply chain environment.

As described and otherwise disclosed herein, example implementations of the present disclosure allow for improved security, control, and observational transparency over of the movement of products, materials, or other physical objects at all points in a supply chain. By using a distributed ledger that is replicated, shared, and synchronized across the various actors in a given supply chain, the status of the object moving through the supply chain, and the status of the various actors in the supply chain with respect to the proper transport, receipt, and storage of the object can be documented and shared in a manner that allows for the rapid detection of, and response to, situations that may cause the object to fall out of conformity with a given specification. In some example implementations, the use of the distributed ledger also allows for the various actors in the supply chain to access definitive information regarding the specifications and related conditions that govern the proper transport, receipt, and storage of the objects. Moreover, some example implementations involve the use of lockers that are configured to access the distributed ledger to provide a secure, identifiable location within which an object can be placed and maintained in accordance with the specifications associated with the given object.

The present disclosure thus includes, without limitation, the following example implementations.

Some example implementations provide a method for observing and directing the movement of a physical object from a location to a destination, the method comprising receiving a set of specifications for a physical object, the set of specifications comprising physical dimensions of the physical object, an identification of a material composition of the physical object, a movement parameter, and an environmental control condition requirement for the physical object; accessing a copy of a distributed ledger that is replicated, shared, and synchronized across a network; writing the set of specifications for the physical object to the copy of the distributed ledger; determining, at a first location, whether the physical object conforms to the set of specifications; adding a first update to the distributed ledger based on the determination that the physical object conforms to the set of specifications; receiving, from a first destination, an indication that the first destination is configured to receive the physical object in conformance with the set of specifications; transporting the physical object from the first location to the first destination; and receiving, from the first destination via the distributed ledger, an indication that the physical object conforms to the set of specifications.

In some example implementations of the method of any preceding example implementation, or any combination of any preceding example implementations, the environmental control condition requirement comprises a time, humidity, barometric, atmospheric, or temperature requirement associated with the physical object.

In some example implementations of the method of any preceding example implementation, or any combination of any preceding example implementations, the movement parameter comprises an acceleration, deceleration, vertical jolting or lateral jolting requirement associated with the physical object.

In some example implementations of the method of any preceding example implementation, or any combination of any preceding example implementations, the indication that the first destination is configured to receive the physical object in conformance with the set of specification includes a real-time indication of a status of the first destination.

In some example implementations of the method of any preceding example implementation, or any combination of any preceding example implementations, the method further comprises receiving, from a second destination, an indication that the second destination is configured to receive the physical object in conformance with the set of specifications; transporting the physical object from the first destination to the second destination; and receiving, from the second destination via the distributed ledger, a second indication that the physical object conforms to the set of specifications.

In some example implementations of the method of any preceding example implementation, or any combination of any preceding example implementations, the method further comprises determining a time at which to begin transporting the physical object from the first location to the first destination based on the set of specifications, a predicted future status of the first location, and a predicted future status of the first destination, and a predicted future status of the second destination.

In some example implementations of the method of any preceding example implementation, or any combination of any preceding example implementations, receiving, from the first destination via the distributed ledger, the indication that the physical object conforms to the set of specifications comprises receiving the physical object at a secure, dedicated locker configured to monitor an environmental condition of the physical object.

In some example implementations of the method of any preceding example implementation, or any combination of any preceding example implementations, the locker is configured to access the distributed ledger and add a second update to the distributed ledger.

Some example implementations provide an apparatus for observing and directing the movement of a physical object from a location to a destination, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for observing and directing the movement of a physical object from a location to a destination, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
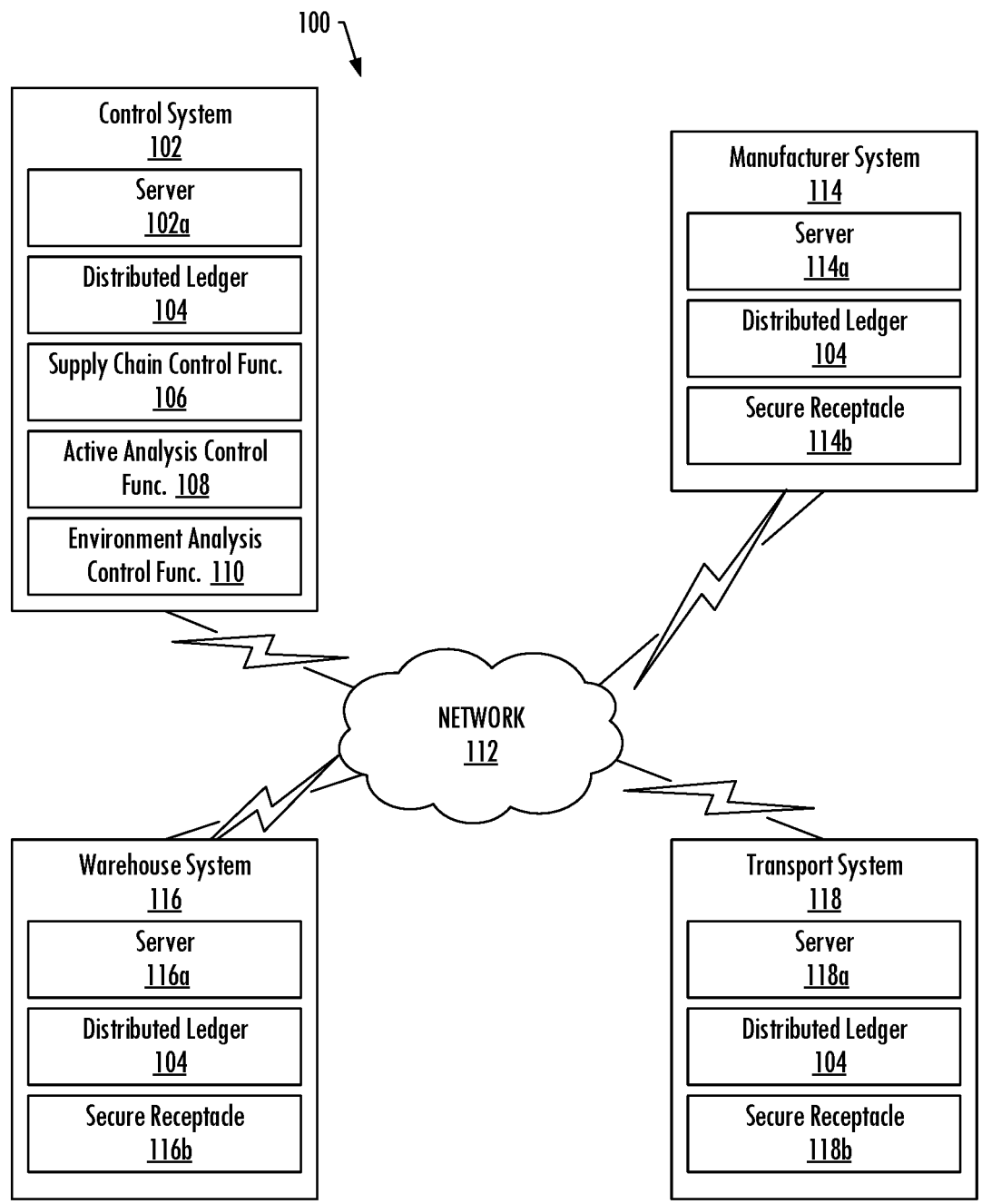
FIG. 1 illustrates a system for observing and directing the movement of a physical object from a location to a destination, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

Example implementations of the present disclosure are directed to the transportation of products and materials and, in particular, to maintaining conformity with product or material-specific specifications in a multi-modal or otherwise complex transportation environment. To address many of the technical challenges present in modern supply chains, increased transparency is necessary with respect to the movement of objects through the supply chain and the capabilities of the various actors within the supply chain. Many modern supply chains are made up of multiple, unrelated actors, such as manufacturers (including but not limited to suppliers and interim manufacturers, for example), transportation agents (such as shipping and logistics providers, for example), warehouse operators, and the like, each of whom may interact with an object before it reaches the end point of the supply chain. The lack of integration between the actors in a supply chain often results in a lack of communication between entities, delays in the exchange of important information, and incomplete documentation, which can ultimately lead to untimely deliveries, loss or damage with respect to objects moving through the supply chain, and an inability to identify and rectify supply chain problems in a timely manner.

The technical challenges associated with many supply chains are compounded in situations where the objects moving through the supply chain are subject to specifications regarding the environmental conditions the object may be exposed to, the safe or otherwise proper handling of the object, or other specifications that must be maintained at all times during the movement of an object from its origination point to its final destination. Additional complications can be introduced when the objects moving through the supply chain have physical dimensions or material compositions that require consideration during their transport and storage. These complications can result in objects being placed out of specification while in transit, arriving at an interim destination that is not equipped to properly receive and store the objects, and other losses.

It will be appreciated that many of the example implementations described herein arise in the context of supply chains used in connection with the production of aircraft and other aviation-related products. However, it will also be appreciated that the use of an example, term, or concept that may be directed to such aviation-related contexts should not be interpreted as confining example implementations of the present disclosure to such contexts.

The materials, products, and other objects used in connection with the production of aircraft and other aviation-related endeavors are often exhibit the physical dimensions, material compositions, movement restrictions, environmental control conditions, and other specifications that confront and compound many of the technical challenges that arise in modern supply chains. In particular, situations involve the movement of materials, products, or other objects that are sensitive to time, humidity, and temperature requirements that must be maintained throughout the movement of the product from its point of origin to the end-point of the supply chain.

Conventional approaches to maintaining and confirming conformity with the specifications associated with objects in a supply chain while providing secure transportation, interim warehousing, and delivery are often vulnerable to disruptions in the form of weather, mechanical transportation delays, malicious actors disrupting the continuity, security, or capabilities of the supply chain infrastructure, or the like. In some contexts, such as those common in the production of aircraft and aviation-related products, the materials, products, and other objects that are lost, damaged, or otherwise placed out of specification can be rare, costly, or difficult to replace, which in turn can result in substantial losses of time and other resources.

Example implementations of the present disclosure address these and other technical challenges by using a distributed ledger and a control system to provide visibility into the supply chain, to allow for the monitoring of the status of objects that are subject to any of a number of types of specifications during their movement through the supply chain, and to redirect objects or otherwise respond to potential failures in the supply chain. In some example implementations, systems associated with each actor in the supply chain are able to interact with the distributed ledger, the control system, and other actors in the supply chain. Since the distributed ledger acts as a reliable, shared source of information about the specifications, location, and status of the relevant object moving through the supply chain, the various actors in the supply chain, including but not limited to the control system, can readily confirm the status of the various actors, make reliable predictions with respect to the timing considerations, and can otherwise provide a robust, high-veracity, high-visibility supply chain.

FIG. 1 illustrates a supply chain system environment 100 for observing and directing the movement of one or more physical objects, in which example implementations of the present disclosure may be realized. The environment 100 may include any of a number of different systems (and subsystems or functional elements thereof, for example) for performing one or more functions or operations. As shown, in some examples, the system environment 100 includes a control system 102, a manufacturer system 114, a warehouse system 116, and a transport system 118.

The systems shown in system environment 100, including the control system 102, manufacturer system 114, the warehouse system 116, and the transport system 118 may be co-located or directly coupled to one another, or in some examples, various ones of the systems or subsystems thereof may communicate with one another across one or more computer networks 112. Further, although shown as part of the system environment 100, it should be understood that any one or more of the above may function or operate as a separate system without regard to any of the other subsystems. It should also be understood that the system may include one or more additional or alternative systems or subsystems than those shown in FIG. 1.

As shown in FIG. 1, each of the control system 102, manufacturer system 114, the warehouse system 116, and the transport system 118 include respective servers, with server 102a being included in the control system 102, the manufacturer server 114a being included in the manufacturer system 114, the warehouse server 116a being included with the warehouse system 116, and the transport server 118a being included with the transport system 118. As also shown in FIG. 1, each of the control system 102, manufacturer system 114, the warehouse system 116, and the transport system 118 include a local copy of the distributed ledger 104.

The distributed ledger 104, along with the control system 102, manufacturer system 114, the warehouse system 116, and the transport system 118 (and their respective servers 102a, 114a, 116a, and 118a) may operate together to allow the distributed ledger 104 to provide for the sharing of specifications that are associated with an object in the supply chain, status information regarding an object in the supply chain, status information regarding the ability of one or more aspects of the supply chain, communications between any system within the supply chain system environment 100, or other information regarding the supply chain, objects in the supply chain, or the operation of the supply chain, for example.

In some example implementations, the distributed ledger 104 is replicated, shared and synchronized across the various systems in the supply chain system environment 100, including the control system 102, manufacturer system 114, the warehouse system 116, and the transport system 118, each of which has a local copy of the distributed ledger. The servers 102a, 114a, 116a, and 118a are each configured to manage the distributed ledger 104, or more particularly a respective local copy of the distributed ledger 104. In some examples, servers 102a, 114a, 116a, and 118a are configured to record digital data in additional immutable entries in its local copy of the distributed ledger 104, and implement a consensus algorithm to ensure replication and synchronization of digital data across the control system 102, manufacturer system 114, the warehouse system 116, and the transport system 118.

The distributed ledger 104 is a consensus of replicated, shared and synchronized digital data spread across the control system 102, manufacturer system 114, the warehouse system 116, and the transport system 118. In some examples, the distributed ledger 104 is implemented as a database spread across the control system 102, manufacturer system 114, the warehouse system 116, and the transport system 118, each of which replicates and saves a respective local copy of the distributed ledger 104 and independently updates it. The distributed ledger 104 and thereby each respective local copy includes immutable entries of digital data, where immutable is defined as unchangeability of the digital data stored in the distributed ledger 104.

In some examples, the distributed ledger 104 may be implemented as a blockchain, which is a continuously growing list of immutable entries (records), called blocks, that are linked and secured using cryptography. Each block in a blockchain may contain a cryptographic hash of a previous block, a timestamp, and transaction data. A blockchain is inherently resistant to modification of the digital data stored in the blockchain. A blockchain may be used as a decentralized, distributed, and public or private permissions based digital ledger for recording transactions across systems within the supply chain system environment 100.

The distributed ledger 104 may therefore include immutable entries with a number of different types of data relevant to the supply chain system environment 100, its systems (such as the control system 102, manufacturer system 114, the warehouse system 116, and the transport system 118, for example). In some examples, the distributed ledger 104 includes immutable entries that document specifications associated with an object, including but not limited to physical dimensions of the physical object, an identification of a material composition of the object, a movement parameter associated with the object (such as requirements with respect to one or more acceleration, deceleration, vertical jolting, or lateral jolting limits that the object may be subject to, for example), and an environmental control condition requirement (such as requirements with respect to one or more of a time, humidity, barometric, atmospheric, or temperature limits that the object may be subject to, for example). In some example implementations, the distributed ledger 104 includes immutable entries pertaining to order information; additional object information, packaging information, additional transportation requirement, shipping protocols, other storage requirements, object location and movement information, information regarding the allowable proximity of the object to one or more other objects or types of materials, object quality information, and information regarding the ownership or control (and changes in ownership or control) of the object as it moves through the supply chain.

It will be appreciated that some example implementations of supply chain system environment 100, contemplate the use of the distributed ledger 104 to develop a secure, indelible distributed ledger-based record of all events related to physical objects as they move through a supply chain. In some such example implementations, the record of information to the distributed ledger 104 may begin early in the lifecycle of the relevant physical object, such was when the raw materials used in the manufacturing or production of the object are acquired by the originating manufacturer, and continue through all of the steps in the supply chain (such as production of the object, packing for shipping, shipping from the manufacturer to a warehouse, and final delivery, for example). As such, a threaded awareness of the material, equipment, object status, events, processes and, actors associated with a given object can be determined and stored in the distributed ledger 104.

To acquire some of the information needed to establish a comprehensive record of all events or occurrences associated with an object, some example implementations contemplate the use of a secure receptacle (such as secure receptacle 114b, 116b, and 118b, for example), which may be referred to as a secure locker. In some example implementations, the secure receptacle is fitted with sensors capable of monitoring the specifications associated with a given physical object (such as temperature, humidity, other environmental conditions, or any other specification, for example), and document the monitored aspects of the object within the distributed ledger 104.

As shown in FIG. 1, the supply chain system environment 100 includes a control system 102. The control system 102 is configured to monitor and control a supply chain and the movement of a physical object through the supply chain. As shown in FIG. 1, the control system 102 is configured to communicate with each of the other systems (such as manufacturer system 114, warehouse system 116, and transport system 118, for example) in the supply chain system environment 100 via one or more networks 112. In the example system environment 100 shown in FIG. 1, control system 102 includes a server 102a and a local copy of the distributed ledger 104. The control system 102 also includes subsystems of functions that allow the control system 102 to monitor the movement and status of a physical object through the supply chain, actively analyze the status of the physical object and the various other actors in the supply chain and control the movement of the object through the supply chain, and analyze environmental considerations that may impact the supply chain, depicted as the supply chain control function 106, the active analysis control function 108, and the environmental analysis control function 110, respectively.

In some example implementations, the control system 102 uses the supply chain control function 106 to monitor all aspects of the relevant supply chain involving the movement and status of the physical object, and may be further configured to interact with systems outside of the supply chain via network 112. In some example implementations of the supply chain system environment 100, the various systems in the supply chain (such as manufacturer system 114, warehouse system 116, or transport system 118, for example) may be registered and managed by the supply chain control function 106 through the assisted discovery of the systems, which may be in turn verified and coordinated with their respective owners. Upon registration, with the control system 102 via the operation of supply chain control function 106, monitoring of and access to the systems (such as manufacturer system 114, warehouse system 116, or transport system 118, for example) can be handled by the supply chain control function 106. As events and other information are recorded to the distributed ledger 104, the supply chain control function 106 may monitor the information on the distributed ledger or otherwise acquired (such as from manufacturer system 114, warehouse system 116, or transport system 118, for example), and take further action (such as through the interaction with one or more systems outside of the supply chain, for example) based on the information.

In some example implementations, the supply chain control function 106 may interface with systems associated with contractual fulfillment, and provide documentation or other information from the distributed ledger 104 that pertains to contractual aspects of the physical object. In some example implementations, such as when an object is determined to be lost, damaged, or otherwise out of specification, for example, the supply chain control function 106 may interact with one or more systems associated with warranty or insurance claims to initiate efforts to remediate supply chain failures. In some example implementations, the supply chain control function may analyze multiple entries in the distributed ledger 104 to identify changes in the quality of one or more products or other objects, and address issues with insufficient product quality or variations in product quality, for example. In some example implementations, the supply chain control function 106 may also be used to interrogate the distributed ledger 104 to provide information associated with regulatory or other legal requirements, such as requirements regarding the documentation and handling of certain materials, or in connection with an investigation, for example.

As shown in FIG. 1, the control system 102 may also include the active analysis control function 108. In some example implementations, the active analysis control function integrates information associated with the active status of the object (such as its location, next destination, and specification conformity, for example) with information about the conditions and capabilities of the various elements of the supply chain (such as capacity, elasticity, delays, alternatives, and space availability, for example). In connection with information from the environmental analysis control function 110, the active analysis control function 108 may determine alternative logistical pathways to meet an endpoint delivery requirement. In some example implementations, the determination of alternative pathways may be done in real-time or near real-time, based on the timing of the information received via the distributed ledger 104 or otherwise via network 112. For example, if the active analysis control function 108 detects an issue in the supply chain (such as an unforeseen traffic delay, a disruption in the ability of a destination to properly receive the object, or some other issue, for example), the active analysis control function 108 may identify an alternative pathway (such as re-routing to a different location, the use of another transportation agent, or the like, for example) and issue one or more updates to the distributed ledger 104 communicating the change in pathway. In some example implementations, the active analysis control function 108 may provide a predictive determination of achieving one or more delivery parameters (such as an expected delivery date or time, for example) based on the information stored in the distributed ledger 104 or otherwise acquired.

As shown in FIG. 1, the control system 102 may also include the environmental analysis control function 110. In some example implementations, the environmental analysis control function 110 monitors the environmental conditions of the object and its surrounding environment. Some objects that move through the supply chain, such as some of the materials used in connection with the production of aircraft and aviation-related products, are sensitive to temperature, humidity, barometric conditions, atmospheric conditions, and the time spent in such conditions. The environmental analysis control function 110 monitors the distributed ledger 104 for information provided by one or more systems configured to interact with the distributed ledger 104, as well as external information sources for data regarding weather condition, information from transportation environmental control service providers who may be tasked with monitoring one or more conditions on transport vehicles, and sources of environmental conditions at a destination, such as at a warehouse or an end-point destination. Based on the collected and monitored information, the environmental analysis control function 110 may predict periods of time during which the environmental conditions at one or more points along the supply chain may be optimal or otherwise acceptable for a given object, and, in connection with the active analysis control function 108 and/or other functionality associated with the control system 102, plot a logistical pathway with environmental conditions that are optimized for the given object.

As shown in FIG. 1, the supply chain system environment 100 includes a manufacturer system 114 that incorporates a server 114a and a local copy of the distributed ledger 104. In some example implementations, the manufacturer system 114 is associated with an entity that produces or otherwise supplies a physical object that is conveyed via the supply chain.

As shown in FIG. 1, the supply chain system environment 100 also includes a warehouse system 116 that incorporates a server 116a and a local copy of the distributed ledger 104. In some example implementations, the warehouse system 116 is associated with an entity that stores the object that is conveyed via the supply chain. It will be appreciated that, depending on the specific details of a given supply chain, instances of the warehouse system 116 may be associated with one or more interim points along the supply chain or an end-point of the supply chain.

As shown in FIG. 1, the supply chain system environment 100 also includes a transport system 118 that incorporates a server 118a and a local copy of the distributed ledger 104. In some example implementations, the transport system 118 is associated with a transportation agent or other entity (such as a shipping company, for example) responsible for moving an object from one place to another. In some example implementations, all or part of the transport system 118 may be incorporated with or into a vehicle, and may otherwise be mobile.

Each of manufacture system 114, warehouse system 116 and transport system 118 are also depicted as having a secure receptacle, marked in FIG. 1 as secure receptacles 114b, 116b, and 118b, respectively. Significant issues in a supply chain may arise in situations where a given destination is unable to confirm and maintain a space that is sufficient in size and conditions to meet and maintain the specifications associated with a given physical object. Some example implementations of the present disclosure contemplate the use of a secure receptacle, which may be referred to as a locker, to avoid such issues. In some such example implementations, the locker is configured to interact with the distributed ledger 104, and may communicate with one or more systems (such as the control system 102, for example) via the network 112. Some example implementations of the locker provide for a storage device that is lockable (so as to prevent unauthorized access, for example), equipped with motion sensors (which may prevent or track unauthorized movement, for example), equipped with sensors to monitor the internal and external environmental conditions and interactions between materials (such as unintended chemical reactions for example), and be capable of communicating with the distributed ledger 104 to provide accurate, real-time or near-real time information regarding the configuration of the contents of the locker, available storage space, environmental conditions, and acceptable alternative arrangements of the contents of the locker.

As noted herein, the various systems and related elements shown in the supply chain system environment 100 work together to acquire information regarding the supply chain and the movement of one or more physical objects through the supply chain, and may act to control how the physical objects move through the supply chain to maintain conformity with the relevant specifications associated with a given object.

Figure 2:
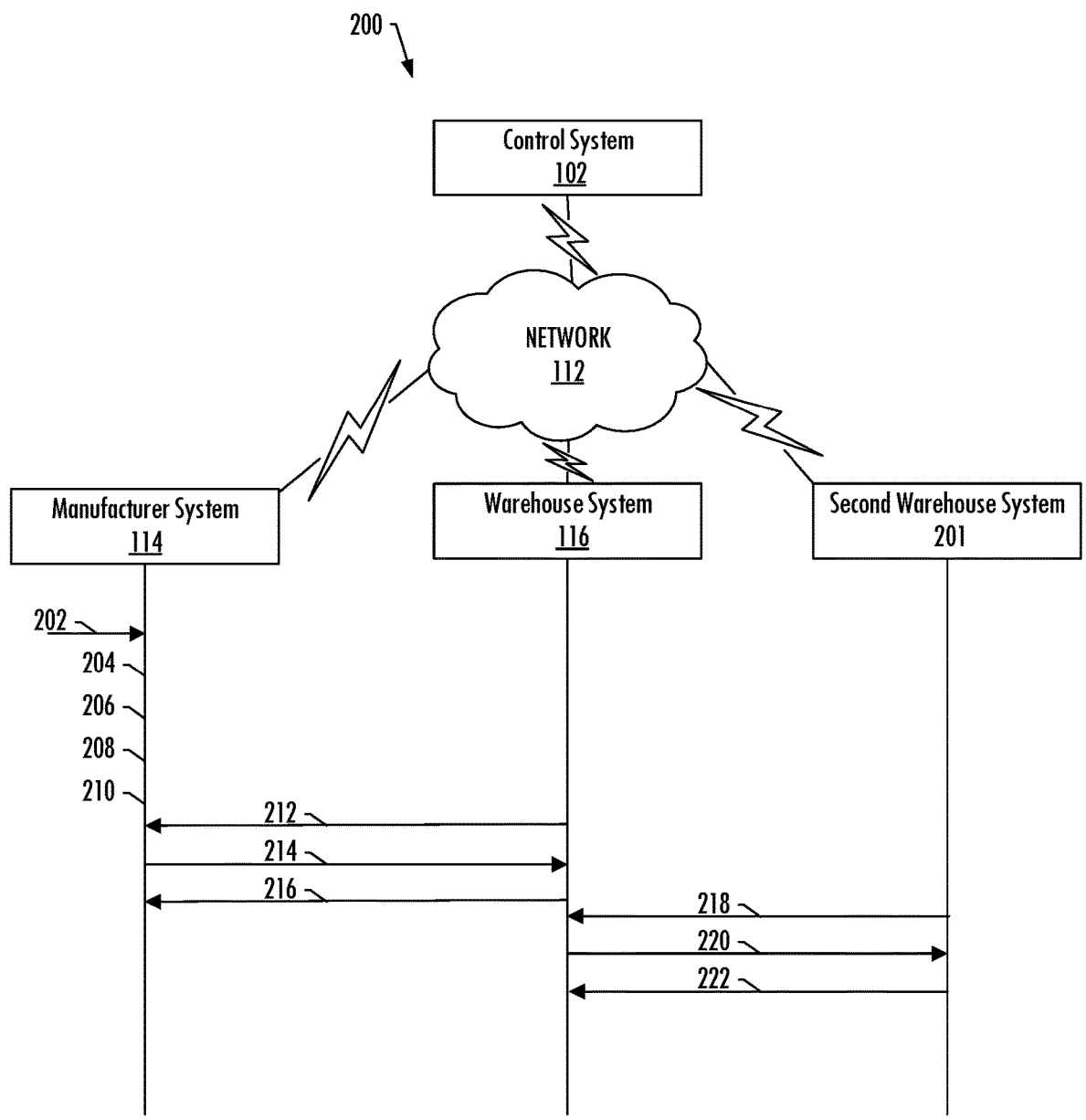
FIG. 2 is a block diagram illustrating communications between system components according to example implementations of the present disclosure.

FIG. 2 illustrates example communication flow 200 between system components according to example implementations of the present disclosure. As shown in FIG. 2, the example communications involve the control system 102, the manufacturer system 114, the warehouse system 116 (which, in the example shown in FIG. 2 could be considered an interim destination in the supply chain), and a second warehouse system 201 (which, in the example system shown in FIG. 2 could be considered an interim destination or an end-point destination). It will be appreciated that all of the systems shown in FIG. 2 are capable of communicating with each other via the network 112. It will also be appreciated that, while FIG. 2 shows the communications being directly sent between the various systems, the communication flow will, in many example implementations, involve one or more communications in the form of updates to the distributed ledger, rather than a direct communication. It will also be appreciated that the control system 102 may, in some example implementations, act as an intermediary system between the other systems, such that the various inter-system communications are all received by or transmitted from the control system 102, which may control the timing, content, or other information associated with one or more communications.

As shown at communication 202, the manufacturer system 114 may receive a set of specifications for a physical object, the set of specifications comprising physical dimensions of the physical object, an identification of a material composition of the physical object, a movement parameter, and an environmental control condition requirement for the physical object. Upon receipt of the specifications, the manufacturer system 114, may, at point 204, access a copy of a distributed ledger that is replicated, shared, and synchronized across a network. As shown at point 206, the manufacturer system may then write the set of specifications for the physical object to the copy of the distributed ledger, which, when synchronized across the network, will ensure that each relevant system has access to the specifications associated with the physical object.

As shown at point 208, upon making, producing, or otherwise acquiring the physical object, the manufacturer system 114 may then determine that the physical object, in its current location, conforms to the set of specifications. In response to determining that the physical object conforms to the set of specifications, the manufacturer system 114 may then, as shown at point 210, update the distributed ledger with the status of the physical object.

As shown at communication 212, the warehouse system 116, which is a destination to which the physical object is to be sent, notifies the manufacturer system 114 (such as through an update to the distributed ledger 104, via a communication to the control system 102, a direct communication to the manufacturer system 114, or the like, for example) that it is configured to receive the physical object. The manufacturer system 114 thus receives, as communication 212, an indication that the first destination (in this case a warehouse associated with warehouse system 116) is configured to receive the physical object in conformance with the set of specifications.

As shown at communication 214, the manufacturer system 114 then causes the physical object to be transported from the first location to the first destination. As shown in more detail in FIG. 3, causing the physical object to be transported from a location to a destination may involve the use and interaction with one or more transport systems. As shown at communication 216, and regardless of the approach used to transport the physical object to the destination, the manufacturer system 114 receives, from the destination via the distributed ledger, an indication that physical object conforms to the set of specifications. In some example implementations, the status of the physical object will be confirmed either automatically (such as via sensors, for example) or manually upon receipt at the location.

As noted herein, in the example presented in FIG. 2, the warehouse system 116 is associated with an interim destination of the physical object, and additional movement of the physical object through the supply chain is may be necessary. As shown in FIG. 2 as communication 218, the warehouse system 116 may receive from a second destination such as second warehouse system 201, an indication that the second destination is configured to receive the physical object in conformance with the set of specifications. Upon receipt of the indication in communication 218, the warehouse system 116 may cause the physical object to be transported, as shown at communication 220, to the second destination with second warehouse system 201. Similar to communication 216, after the second warehouse system confirms that the physical object conforms to the specifications, the warehouse system 116, receives communication 222 from the second warehouse system 201 via the distributed ledger 104 a second indication that the physical object conforms to the specifications.

As discussed herein with respect to FIGS. 1-2 some example implementations of the present disclosure involve the use of transportation agents that may use one or more transport systems 118 (which may, for example, be incorporated into a vehicle used to transport the physical item.

Figure 3:
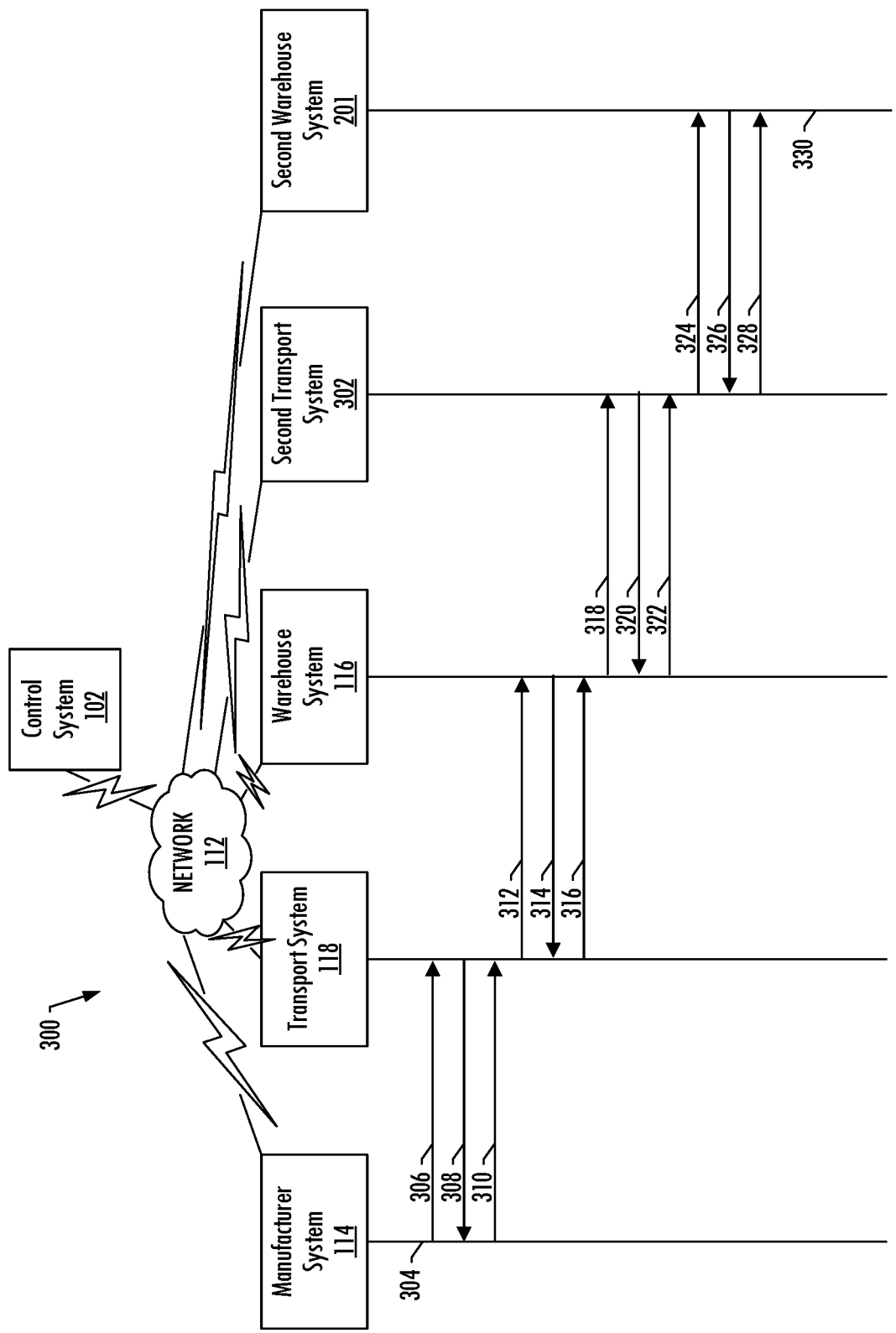
FIG. 3 is a block diagram illustrating example interactions between system components according to example implementations of the present disclosure.

FIG. 3 illustrates a communication flow 300 that is an expanded and modified version of the communication flow 200 shown in FIG. 2. As with FIG. 2, the communication flow 300 involves communications between the control system 102, manufacturer system 114, warehouse system 116, and a second warehouse system 201. The environment in FIG. 3 is expanded and modified over that shown in FIG. 2 to incorporate transport system 118 that is involved with moving a physical object from a location associated with the manufacturer system 114 to a destination associated with warehouse system 116, and the second transport system 302, which is involved with moving the physical object from the destination associated with warehouse system 116 to a second destination associated with second warehouse system 201. As with the example communication flow 200 in FIG. 2, the communications depicted in communication flow 300 may be implemented via the distributed ledger 104 and/or via the control system 102.

As shown in FIG. 3, the communication flow 300 may start at manufacturer system 114, at point 304, where the manufacturer system determines that the object conforms with the specifications, and this therefore ready to move through the supply chain. As shown at communication 306, the manufacturer system 114 notifies the transport system 118 that the object is ready to be released to the transport agent associated with the transport system 118. Upon receipt of communication 306, the transport system may access the distributed ledger 104 to determine that the transport system 118 has resources available to transport the object properly. The transport system 118 may then send communication 308 to the warehouse system 116 to confirm that the transport system is authorized to and capable of transporting the physical object, and may dispatch a vehicle to pick up the object. Once the vehicle arrives, the physical object can be transferred to the transport system 118 at communication 310.

As shown at communication 312, the transport system 118 communicates with the warehouse system 116 associated with the intended location for the physical object at communication 312 to ascertain whether the transport system 118 can deliver the object. Upon confirmation that it is capable of receiving the object (such as by accessing the distributed ledger 104 and assessing the resources available, for example), the warehouse system 116 notifies the transport system 118 via communication 314 that the warehouse can receive and store the object. As shown at communication 316, the transport system then completes delivery of the object.

As shown in FIG. 2, a similar process occurs with respect to the movement of the object from a destination associated with warehouse system 116 to a second destination associated with second warehouse system 201 via the second transport system 302. At communication 318, the warehouse system 116 notifies the second transport system 302 that the object is ready for shipping. Upon confirmation of the ability to transport the object, the second transport system 302 informs the warehouse system 116 that it is authorized to transport the object at communication 320, and dispatches a vehicle to acquire the object. As shown at communication 322, the second transport system 302 transports the object away from the warehouse system 116 towards the location associated with second warehouse system 201.

In connection with transporting the object, the second transport system 302 sends communication 324 to confirm that the object may be delivered to the second destination associated with second warehouse system 201. The second warehouse system then confirms, as shown at communication 326, that it is capable of receiving the object, and second transport system 302 responds at communication 328 by completing the delivery. Upon receipt of the object, the second warehouse system may perform any of a number of actions at point 330, including but not limited to confirming the status of the object, notifying a purchaser, and/or otherwise updating the distributed ledger 104 to reflect a status of the object and any relevant conditions.

Figure 4:
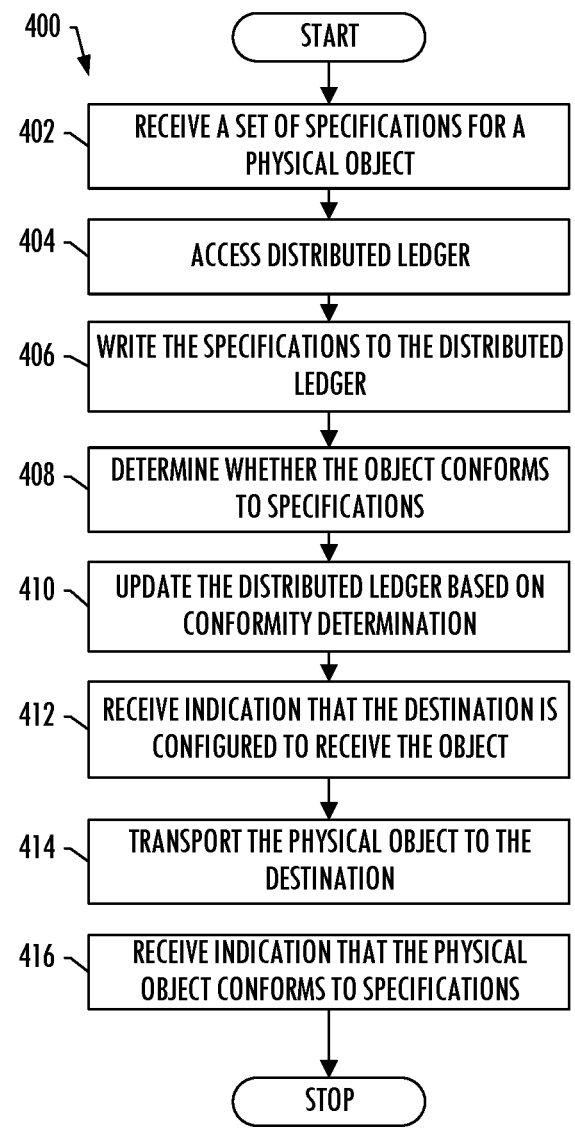
FIG. 4 is a flowchart illustrating various steps in a method for observing and directing the movement of a physical object from a location to a destination, according to example implementations of the present disclosure.

FIG. 4 is a flowchart illustrating various steps in a method 400 for observing and directing the movement of a physical object from a location to a destination, according to example implementations of the present disclosure. As shown at block 402, the method includes receiving a set of specifications for a physical object. Some example implementations of block 402 include receiving a set of specifications for a physical object, the set of specifications comprising physical dimensions of the physical object, an identification of a material composition of the physical object, a movement parameter, and an environmental control condition requirement for the physical object. It will be appreciated that some example implementations of block 402 may include or otherwise incorporate any aspect of the approaches discussed herein with respect to communication 202 in FIG. 2. It will also be appreciated that the set of specifications used in example implementations of block 402 may include any of the specifications described or otherwise disclosed herein. In some example implementations of block 402, the environmental control condition requirement comprises a time, humidity, barometric, atmospheric, or temperature requirement associated with the physical object. In some such example implementations of block 402, and in other example implementations of block 402, the movement parameter comprises an acceleration, deceleration, vertical jolting or lateral jolting requirement associated with the physical object.

As shown at block 404, the method 400 includes accessing a distributed ledger. In some example implementations of block 404, accessing the distributed ledger includes accessing a copy of a distributed ledger that is replicated, shared, and synchronized across a network. It will be appreciated that any of the approaches described or otherwise disclosed herein involving accessing a distributed ledger, including but not limited to those discussed herein with respect to point 204 in FIG. 2 and distributed ledger 104 presented in FIG. 1 may be used in example implementations of block 404.

As shown at block 406, the method 400 includes writing the specifications to the distributed ledger. Some example implementations of block 406 include writing the set of specifications for the physical object to the copy of the distributed ledger. It will be appreciated that any of the approaches described or otherwise disclosed herein involving writing to a distributed ledger, including but not limited to those discussed or otherwise disclosed herein with respect to point 206 in FIG. 2, distributed ledger 104 presented in FIG. 1, or any of the systems in supply chain system environment 100 in FIG. 1 may be used in example implementations of block 406.

As shown at block 408, the method 400 includes determining whether the object conforms to specifications. Some example implementations of block 408 include determining, at a first location, whether the physical object conforms to the set of specifications. It will be appreciated that any of the approaches described or otherwise disclosed herein with respect to point 208 in FIG. 2 may be used in connection with example implementations of block 408. In some example implementations of block 408, data acquired from one or more sensors, such as a temperature sensor, humidity sensor, other environmental condition sensor, an accelerometer, strain gauge, or the like may be used to determine if the object conforms to the relevant specifications. In some example implementations, manual verification of aspects of the product may be used. Regardless of the approach used to verify conformance with the specifications, some example implementations of block 408 involve accessing the specifications stored in the distributed ledger to identify and confirm the specifications themselves or otherwise access information pertinent to a determination of the status of the object.

As shown at block 410, the method 400 also includes updating the distributed ledger based on the conformity determination. Some example implementations of block 210 involve adding a first update to the distributed ledger based on the determination that the physical object conforms to the set of specifications. It will be appreciated that any of the approaches described or otherwise disclosed herein involving writing to a distributed ledger, including but not limited to those discussed or otherwise disclosed herein with respect to point 210 in FIG. 2, distributed ledger 104 presented in FIG. 1, or any of the systems in supply chain system environment 100 in FIG. 1 may be used in example implementations of block 410.

As shown in block 412, the method 400 also includes receiving and indication that the destination is configured to receive the object. Some example implementations of block 412 involve receiving, from a first destination, an indication that the first destination is configured to receive the physical object in conformance with the set of specifications. It will be appreciated that any of the approaches described or otherwise disclosed herein with respect to block 212 in FIG.

2, and any of the approaches described or otherwise disclosed herein with respect to the determination that a destination is capable of or otherwise configured to receive the physical object in conformance with the specifications (such as in connection with the discussions of warehouse system 116 or transport system 118, for example), may be used in connection with example implementations of block 412. Moreover, in some example implementations, the indication that the first destination is configured to receive the physical object in conformance with the set of specification includes a real-time indication of a status of the first destination. As noted herein, some systems (such as warehouse system 116 or transport system 118, for example) are configured to provide real-time or near real-time information regarding the environmental conditions, spatial considerations, and other factors impacting readiness to receive an object via updates to a distributed ledger (such as distributed ledger 104, for example) or via communication with control system 102 or a component thereof.

As shown in block 414, the method 400 includes transporting the physical object to the destination. Some example implementations of block 414 include transporting the physical object from the first location to the first destination. It will be appreciated that in many example implementations, transporting the physical object include placing the object on an appropriate vehicle (such as a truck, train, or airplane, for example) for transport. Any of the approaches discussed or otherwise disclosed herein for transporting an object may be used in connection with example implementation of block 414, including but not limited to those presented in connection with communication 214 of FIG. 2, the various transportations depicted in FIG. 3, and/or the discussion of transport system 118 in connection with FIG. 1.

As shown in block 416, the method 400 also includes receiving an indication that the physical object conforms to specifications. Some example implementations of block 416 include receiving, from the first destination via the distributed ledger, an indication that the physical object conforms to the set of specifications. It will be appreciated that any approach described or otherwise disclosed herein with respect to determining that an object conforms to its specifications and using the distributed ledger to document and communicate that determination, including but not limited to those discussed or otherwise disclosed with respect to communication 216 of FIG. 2, may be used in connection with example implementations of block 416.

In some example implementations of block 416, receiving, from the first destination via the distributed ledger, the indication that the physical object conforms to the set of specifications comprises receiving the physical object at a secure, dedicated locker configured to monitor an environmental condition of the physical object. In some such example implementations, and in other example implementations, the locker is configured to access the distributed ledger and add a second update to the distributed ledger. It will be appreciated that any implementations of a secure receptacle or locker described or otherwise disclosed herein may be used in connection with implementations of block 416, including but not limited to those described and otherwise disclosed in connection with the secure receptacles 114*b*, 116*b*, and 118*b* in FIG. 1.

Figure 5:
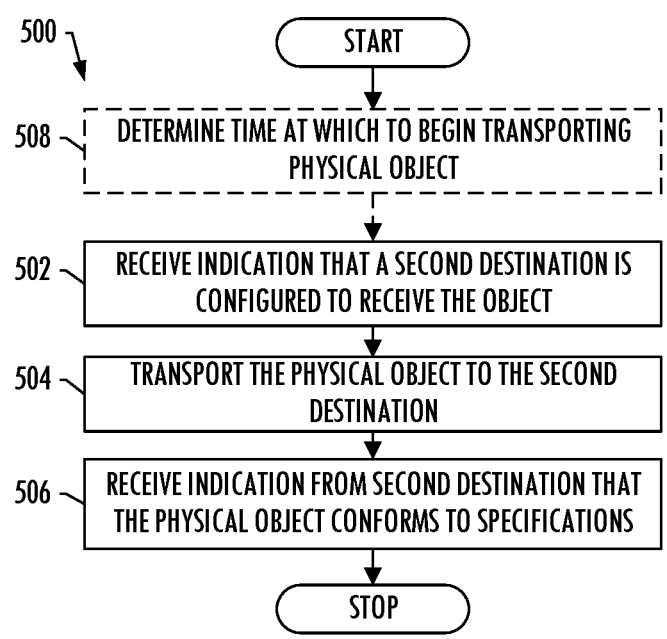
FIG. 5 is a flowchart illustrating additional various steps in a method for observing and directing the movement of a physical object from a location to a destination, according to example implementations.

FIG. 5 is a flowchart illustrating various additional steps in a method 500 for observing and directing the movement of a physical object from a location to a destination, according to example implementations of the present disclosure. It will be appreciated that some example implementations of the various additional steps presented in FIG. 5 may be incorporated into example implementations of the method 400 described in connection with FIG. 4. Taken collectively, steps 502, 504, and 506 present steps that may be advantageous in supply chain environments where a physical object may need to move between multiple destinations before arriving at an end-point destination or otherwise being removed from the supply chain.

As shown in block 502, the method 500 includes receiving an indication that a second destination is configured to receive the object. Some example implementations of block 502 include receiving, from a second destination, an indication that the second destination is configured to receive the physical object in conformance with the set of specifications. It will be appreciated that any of the approaches described or otherwise disclosed herein with respect to communication 218 in FIG. 2 may be used in connection with example implementations of block 502. Similarly, the approaches described with respect to communication 212 in FIG. 2 and block 412 in FIG. 4 regarding generation, transmission, and receipt of an indication that a destination is configured to receive a physical object in conformance with a set of specifications may be used in example implementations of block 502.

As shown in block 504, the method 500 also includes transporting the physical object to the second destination. Some example implementations of block 504 include transporting the physical object from the first destination to the second destination. It will be appreciated that any of the approaches described or otherwise disclosed herein with respect to the transport of an object, including but not limited to those discussed in connection with communication 220 or 214 in FIG. 2 or block 414 in FIG. 4, may be used in connection with example implementations of block 504.

As shown in block 506, the method 500 also includes receiving an indication from the second destination that the physical object conforms to specifications. Some example implementations of block 506 include receiving, from the second destination via the distributed ledger, a second indication that the physical object conforms to the set of specifications. It will be appreciated that any approach described or otherwise disclosed herein with respect to determining that an object conforms to its specifications and using the distributed ledger to document and communicate that determination, including but not limited to those discussed or otherwise disclosed with respect to communications 222 and 216 of FIG. 2 and block 416 of FIG. 4, may be used in connection with example implementations of block 506.

As shown in block 508, the method 500 may include determining a time at which to being transporting the physical object. Some example implementations of block 508 include determining a time at which to begin transporting the physical object from the first location to the first destination based on the set of specifications, a predicted future status of the first location, and a predicted future status of the first destination, and a predicted future status of the second destination. It will be appreciated that block 508 is presented in dashed lines because it is a step that may or may not be performed multiple times in connection with example implementations of method 500 or method 400. As discussed herein with respect to control system 102, particularly with respect to the environmental analysis control function 110, some example implementations of the present disclosure contemplate determining (such as from data stored in the distributed ledger, and/or otherwise acquired, for example) predicted time periods where various actors in the supply chain are likely to experience environmental conditions that are optimal or otherwise acceptable for the transport and storage of objects that may be sensitive to particular environment conditions. Based on the predicted time periods and information about the time needed to move an object from position to another, for example the control system 102 or another aspect of an example implementation of the present disclosure may identify a time at which a product should begin moving through the supply chain with the goal of ensuring that the object experiences the available environmental conditions that are less likely to put the object out of specification.

According to example implementations of the present disclosure, the system environment 100 and the systems therein including the control system 102, manufacturer system 114, warehouse system 116, and transport system 118 may be implemented by various means. Means for implementing the system environment, the systems therein, and any related subsystems or functions may include hardware, alone or under direction of one or more computer programs from a computer-readable storage medium. In some examples, one or more apparatuses may be configured to function as or otherwise implement the system environment, and the related systems and subsystems shown and described herein. In examples involving more than one apparatus, the respective apparatuses may be connected to or otherwise in communication with one another in a number of different manners, such as directly or indirectly via a wired or wireless network or the like.

Figure 6:
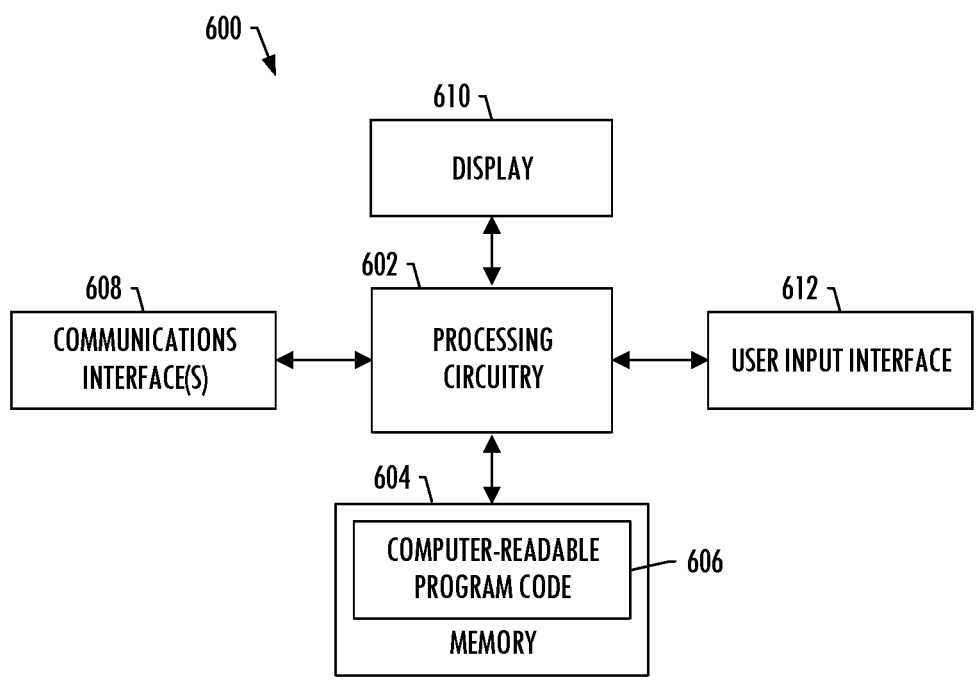
FIG. 6 illustrates an apparatus according to some example implementations.

FIG. 6 illustrates an apparatus 600 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 602 (e.g., processor unit) connected to a memory 604 (e.g., storage device).

The processing circuitry 602 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 604 (of the same or another apparatus).

The processing circuitry 602 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processing circuitry 602 may also be connected to one or more interfaces for displaying, transmitting and/or receiving information. The interfaces may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 may include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for observing and directing movement of a physical object from a location to a destination, the method comprising:
    receiving a set of specifications for the physical object before the physical object is to be transported, the set of specifications comprising physical dimensions of the physical object, an identification of a material composition of the physical object, a movement parameter, and one or more environmental control condition requirements for the physical object;
    accessing a copy of a distributed ledger that is replicated, shared, and synchronized across a network, wherein the distributed ledger comprises a set of immutable entries;
    writing the set of specifications for the physical object to the copy of the distributed ledger;
    acquiring physical aspect data on the physical object using one or more sensors;
    using at least the physical aspect data as acquired to determine, at a first location, whether the physical object conforms to the set of specifications;
    adding a first update to the distributed ledger based on the determination that the physical object conforms to the set of specifications;
    receiving, from a first destination, an indication that the first destination is configured to receive the physical object in conformance with the set of specifications;
    predicting one or more points between the first location and the first destination where environmental conditions will comply with the one or more environmental control condition requirements for the physical object;
    plotting a logistical pathway from the first location to the first destination according to the one or more points;
    transporting the physical object from the first location to the first destination according to the logistical pathway;
    receiving the physical object at a secure, dedicated locker configured to monitor an environmental condition of the physical object such that the environmental condition of the physical object is immutably stored on the distributed ledger, thereby ensuring reliability of the one or more entries;
    detecting the physical object in the secure, dedicated locker which activates a sensor of the secure, dedicated locker to detect the environmental condition of the physical object;
    accessing, via the secure, dedicated locker, the distributed ledger, after the environmental condition of the physical object is detected; and
    automatically updating, via the secure, dedicated locker, the distributed ledger with one or more entries indicating the environmental condition of the physical object;
    receiving, from the first destination via the distributed ledger, an indication that the physical object conforms to the set of specifications; and
    receiving, from a second destination, an indication that the second destination is configured to receive the physical object in conformance with the set of specifications.

2. The method of claim 1, wherein the one or more environmental control condition requirements comprises one or more of a time, humidity, barometric, atmospheric, or temperature requirement associated with the physical object.

3. The method of claim 1, wherein the movement parameter comprises an acceleration, deceleration, vertical jolting or lateral jolting requirement associated with the physical object.

4. The method of claim 1, wherein the indication that the first destination is configured to receive the physical object in conformance with the set of specifications includes a real-time indication of a status of the first destination.

5. The method of claim 1 further comprising:
    transporting the physical object from the first destination to the second destination; and receiving, from the second destination via the distributed ledger, a second indication that the physical object conforms to the set of specifications.

6. The method of claim 5, further comprising determining a time at which to begin transporting the physical object from the first location to the first destination based on the set of specifications, a predicted future status of the first location, and a predicted future status of the first destination, and a predicted future status of the second destination.

7. The method of claim 1, further comprising the secure, dedicated locker automatically updating the distributed ledger with one or more entries indicating a configuration of contents of the secure, dedicated locker or available storage space of the secure, dedicated locker.

8. The method of claim 7, further comprising the secure, dedicated locker automatically updating the distributed ledger with one or more entries indicating an acceptable alternative arrangement of the contents of the secure, dedicated locker.

9. A system for observing and directing movement of a physical object from a location to a destination, the system comprising processing circuitry and a memory storing executable instructions that, in response to execution by the processing circuitry, cause the system to at least:
receive a set of specifications for the physical object prior to the physical object being transported, the set of specifications comprising physical dimensions of the physical object, an identification of a material composition of the physical object, a movement parameter, and one or more environmental control condition requirements for the physical object;
access a copy of a distributed ledger that is replicated, shared, and synchronized across a network, wherein the distributed ledger comprises a set of immutable entries;
write the set of specifications for the physical object to the copy of the distributed ledger;
acquire physical aspect data on the physical object using one or more sensors:
use at least the physical aspect data as acquired to determine, at a first location, whether the physical object conforms to the set of specifications;
add a first update to the distributed ledger based on the determination that the physical object conforms to the set of specifications;
receive, from a first destination, an indication that the first destination is configured to receive the physical object in conformance with the set of specifications;
predict one or more points between the first location and the first destination where environmental conditions will comply with the one or more environmental control condition requirements for the physical object;
plot a logistical pathway from the first location to the first destination according to the one or more points;
transport the physical object from the first location to the first destination according to the logistical pathway;
wherein the system further comprises a secure, dedicated locker, and the system is further caused to at least receive the physical object at the secure, dedicated locker that is configured to:
detect the physical object in the secure, dedicated locker which activates a sensor of the secure, dedicated locker to detect an environmental condition of the physical object;
after the environmental condition of the physical object is detected, access and automatically update the distributed ledger with one or more entries indicating the environmental condition of the physical object such that the environmental condition of the physical object is immutably stored on the distributed ledger, thereby ensuring reliability of the one or more entries;
receive, from the first destination via the distributed ledger, an indication that the physical object conforms to the set of specifications; and
receive, from a second destination, an indication that the second destination is configured to receive the physical object in conformance with the set of specifications.

10. The system of claim 9, wherein the one or more environmental control condition requirements comprises one or more of a time, humidity, barometric, atmospheric, or temperature requirement associated with the physical object.

11. The system of claim 9, wherein the movement parameter comprises an acceleration, deceleration, vertical jolting or lateral jolting requirement associated with the physical object.

12. The system of claim 9, wherein the indication that the first destination is configured to receive the physical object in conformance with the set of specifications includes a real-time indication of a status of the first destination.

13. The system of claim 9, further caused to at least:
transport the physical object from the first destination to the second destination; and
receive, from the second destination via the distributed ledger, a second indication that the physical object conforms to the set of specifications.

14. The system of claim 13, further caused to determine a time at which to begin transporting the physical object from the first location to the first destination based on the set of specifications, a predicted future status of the first location, and a predicted future status of the first destination, and a predicted future status of the second destination.

15. The system of claim 9, wherein the secure, dedicated locker is configured to automatically update the distributed ledger with one or more entries indicating a configuration of contents of the secure, dedicated locker or available storage space of the secure, dedicated locker.

16. The system of claim 15, wherein the secure, dedicated locker is configured to automatically update the distributed ledger with one or more entries indicating an acceptable alternative arrangement of the contents of the secure, dedicated locker.

17. A computer readable storage medium for observing and directing movement of a physical object from a location to a destination, the computer readable storage medium being non-transitory and having computer readable program code portions stored therein that in response to execution by a processor, cause a system to at least:
receive a set of specifications for the physical object prior to the physical object being transported, the set of specifications comprising physical dimensions of the physical object, an identification of a material composition of the physical object, a movement parameter, and one or more environmental control condition requirements for the physical object;
access a copy of a distributed ledger that is replicated, shared, and synchronized across a network, wherein the distributed ledger comprises a set of immutable entries;
write the set of specifications for the physical object to the copy of the distributed ledger;
acquire physical aspect data on the physical object using one or more sensors;
use at least the physical aspect data as acquired to determine, at a first location, whether the physical object conforms to the set of specifications;

add a first update to the distributed ledger based on the determination that the physical object conforms to the set of specifications;
receive, from a first destination, an indication that the first destination is configured to receive the physical object in conformance with the set of specifications;
predict one or more points between the first location and the first destination where environmental conditions will comply with the one or more environmental control condition requirements for the physical object;
plot a logistical pathway from the first location to the first destination according to the one or more points;
transport the physical object from the first location to the first destination according to the logistical pathway;
wherein the system comprises a secure, dedicated locker, and the system is further caused to at least receive the physical object at the secure, dedicated locker that is configured to:
  detect the physical object in the secure, dedicated locker which activates a sensor of the secure, dedicated locker to detect an environmental condition of the physical object;
  after the environmental condition of the physical object is detected, access and automatically update the distributed ledger with one or more entries indicating the environmental condition of the physical object such that the environmental condition of the physical object is immutably stored on the distributed ledger, thereby ensuring reliability of the one or more entries;
receive, from the first destination via the distributed ledger, an indication that the physical object conforms to the set of specifications; and
receive, from a second destination, an indication that the second destination is configured to receive the physical object in conformance with the set of specifications.

18. The computer readable storage medium of claim 17, wherein the one or more environmental control condition requirements comprises one or more of a time, humidity, barometric, atmospheric, or temperature requirement associated with the physical object.

19. The computer readable storage medium of claim 17, wherein the movement parameter comprises an acceleration, deceleration, vertical jolting or lateral jolting requirement associated with the physical object.

20. The computer readable storage medium of claim 17, wherein the indication that the first destination is configured to receive the physical object in conformance with the set of specifications includes a real-time indication of a status of the first destination.

21. The computer readable storage medium of claim 17, wherein the system is further caused to at least:
  transport the physical object from the first destination to the second destination; and
  receive, from the second destination via the distributed ledger, a second indication that the physical object conforms to the set of specifications.

22. The computer readable storage medium of claim 21, wherein the system is further caused to determine a time at which to begin transporting the physical object from the first location to the first destination based on the set of specifications, a predicted future status of the first location, and a predicted future status of the first destination, and a predicted future status of the second destination.

23. The computer readable storage medium of claim 17, wherein the secure, dedicated locker is configured to automatically update the distributed ledger with one or more entries indicating a configuration of contents of the secure, dedicated locker or available storage space of the secure, dedicated locker.

24. The computer readable storage medium of claim 23, wherein the secure, dedicated locker is configured to automatically update the distributed ledger with one or more entries indicating an acceptable alternative arrangement of the contents of the secure, dedicated locker.

* * * * *